(12) United States Patent
Bastin et al.

(10) Patent No.: US 12,416,167 B2
(45) Date of Patent: Sep. 16, 2025

(54) SCUFF RESISTANT SURFACE COVERINGS

(71) Applicant: TARKETT GDL, Lentzweiler (LU)

(72) Inventors: Pierre Bastin, Wiltz (LU); Guillaume Chatte, Wiltz (LU); Jean-Luc Stiernet, Wiltz (LU); Frédéric Pailler, Wiltz (LU)

(73) Assignee: TARKETT GDL, Lentzweiler (LU)

( * ) Notice: Subject to any disclaimer, the term of this patent is extended or adjusted under 35 U.S.C. 154(b) by 621 days.

(21) Appl. No.: 17/601,461

(22) PCT Filed: Apr. 28, 2020

(86) PCT No.: PCT/EP2020/061699
§ 371 (c)(1),
(2) Date: Oct. 5, 2021

(87) PCT Pub. No.: WO2020/233948
PCT Pub. Date: Nov. 26, 2020

(65) Prior Publication Data
US 2022/0195739 A1   Jun. 23, 2022

(30) Foreign Application Priority Data
May 20, 2019   (EP) .................................... 19175419

(51) Int. Cl.
| | | |
|---|---|---|
| *E04F 15/10* | (2006.01) | |
| *B32B 23/08* | (2006.01) | |
| *B32B 23/20* | (2006.01) | |
| *B32B 27/08* | (2006.01) | |
| *B32B 27/22* | (2006.01) | |
| *B32B 27/30* | (2006.01) | |
| *B32B 38/00* | (2006.01) | |

(52) U.S. Cl.
CPC ............ *E04F 15/107* (2013.01); *B32B 23/08* (2013.01); *B32B 23/20* (2013.01); *B32B 27/08* (2013.01);
(Continued)

(58) Field of Classification Search
CPC ......... B32B 23/08; B32B 23/20; B32B 27/08; B32B 27/22; B32B 27/304; B32B 27/306;
(Continued)

(56) References Cited

U.S. PATENT DOCUMENTS 2,093,462 A   9/1937   Malm
2,093,464 A   9/1937   Malm
(Continued)

FOREIGN PATENT DOCUMENTS

CA   2162487 A1   12/1994
EP   0130072 A1   1/1985
(Continued)

OTHER PUBLICATIONS

Written Opinion of the International Searching Authority for corresponding application PCT/EP2020/061699 filed Apr. 28, 2020; Mail date Jul. 10, 2020.
(Continued)

*Primary Examiner* — Donald M Flores, Jr.
(74) *Attorney, Agent, or Firm* — CANTOR COLBURN LLP

(57) ABSTRACT

The present invention discloses a surface covering, in particular a floor or wall covering including a substrate A and a scuff resistant polymer layer B, having an upper and a lower surface, where the polymer layer B includes one or more polymer(s) C, the one or more polymer(s) C having more than 93.5% by weight of cellulose ester polymer(s), where the lower surface of polymer layer B contacts and adheres to the upper surface of substrate A.

20 Claims, 1 Drawing Sheet

(52) U.S. Cl.
CPC ............ *B32B 27/22* (2013.01); *B32B 27/304* (2013.01); *B32B 27/306* (2013.01); *E04F 15/105* (2013.01); *B32B 2038/0076* (2013.01); *B32B 2255/10* (2013.01); *B32B 2255/26* (2013.01); *B32B 2307/554* (2013.01); *B32B 2307/734* (2013.01); *B32B 2419/04* (2013.01); *B32B 2471/00* (2013.01)

(58) Field of Classification Search
CPC ........ B32B 2038/0076; B32B 2255/10; B32B 2255/26; B32B 2307/554; B32B 2307/734; B32B 2419/04; B32B 2471/00; E04F 15/105
See application file for complete search history.

(56) References Cited

U.S. PATENT DOCUMENTS

| | | | |
|---|---|---|---|
| 2,126,460 | A | 8/1938 | Genung |
| 2,196,768 | A | 4/1940 | Hiatt |
| 3,022,287 | A | 2/1962 | Mench |
| 3,878,030 | A * | 4/1975 | Cook ........................ B32B 7/12 428/45 |
| 4,499,137 | A | 2/1985 | O'Dell |
| 4,567,087 | A | 1/1986 | O'Dell |
| 4,741,946 | A | 5/1988 | Ungar |
| 5,458,953 | A | 10/1995 | Wang |
| 5,871,573 | A * | 2/1999 | Cook ........................ C08B 3/16 106/162.7 |
| 2004/0234772 | A1 | 11/2004 | Shortland |
| 2017/0259530 | A1 | 9/2017 | Wade |
| 2018/0347192 | A1 * | 12/2018 | Hartman ............... E04F 15/102 |

FOREIGN PATENT DOCUMENTS

| | | |
|---|---|---|
| EP | 1046688 A1 | 10/2000 |
| WO | 9205219 A1 | 4/1992 |
| WO | 9511333 A1 | 4/1995 |
| WO | 2018017652 A1 | 1/2018 |

OTHER PUBLICATIONS

International Search Report for corresponding application PCT/EP2020/061699 filed Apr. 28, 2020; Mail date Jul. 10, 2020.

* cited by examiner

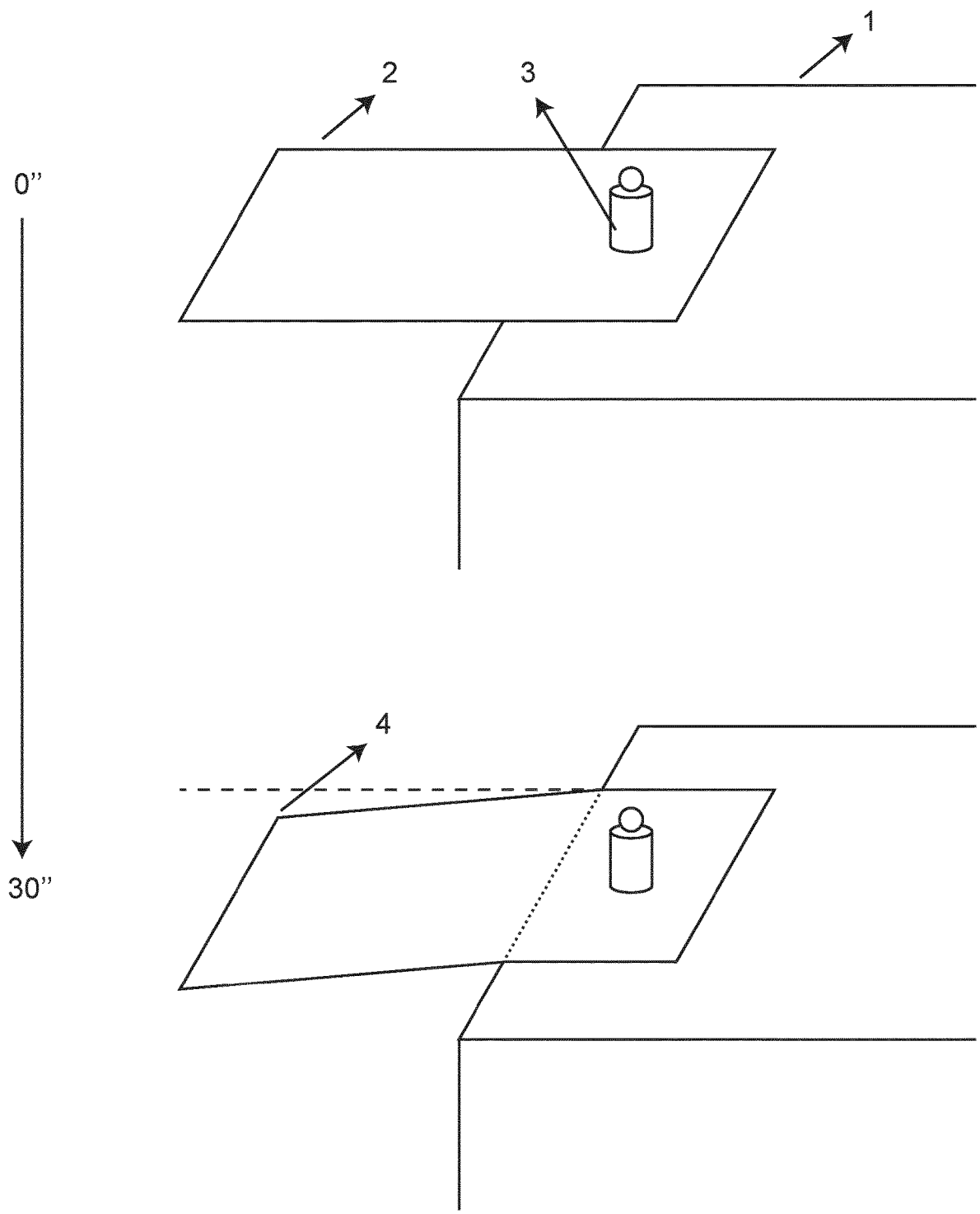

SCUFF RESISTANT SURFACE COVERINGS

FIELD OF THE INVENTION

The present invention is related to scuff resistant surface coverings, in particular a floor or wall coverings, comprising a substrate and at least one polymer layer. The invention is further related to a method for the production of said surface coverings.

STATE OF THE ART

Surface covering materials, especially those adapted for use as floor and wall coverings, must frequently possess a wide range of properties and characteristics. Among these, improved scuff resistance remains a challenge though solutions already has been proposed.

In addition to natural stone tiles and ceramic tiles, a substantial part of the market is represented by surface coverings based on thermoplastic polymers, such as the Luxury Vinyl Tiles, and on rigid substrates, such as the Fibre Cement Tiles and the Hybrid Polymer Composites.

The term "scuff resistance" is the ability of the wear surface to resist plastic flow when subjected to the force and frictional heat caused by the dragging of, for example, rubber or plastic soled shoes.

Till now, scuff resistance of surface coverings in general is improved through the application of a particular topcoat formulation. In many cases, the topcoat formulation comprises a multiple of components, providing a multiple of additional surface properties to the substrate, such as stain-, slip-, and mar-resistance.

U.S. Pat. Nos. 4,499,137, 4,567,087, 4,741,946 and CA1214964 disclose a high-pressure decorative laminate with improved scuff resistance, comprising a backing layer and laminated thereto a thermoset laminating resin impregnated facing sheet having thereon an ultra-thin facing layer, said facing layer having improved scuff by incorporating in or very near the surface thereof, finely divided polyethylene wax.

US 2004/0234772 discloses slip and marking-resistant floor coverings, comprising a low surface tension additive (e.g. a wax or silicone oil) in an amount suitable to improve resistance to marking without substantially decreasing the slip resistance. Generally the low surface tension additive is present in the upper layer of the flooring material. Where the flooring material comprises only base layer(s), the additive is present in the upper base layer. Where the flooring material comprises a coating layer forming an upper layer, the additive is preferably present only in the coating layer. The flooring material may include one or more of a number of types of hard particles, preferably partially embedded in the base layer.

U.S. Pat. No. 5,458,953 discloses a resilient surface covering meeting standards of stain, mar, scuff, and soil resistance, said resilient surface covering comprising
(a) a resilient support surface and
(b) a resilient wear surface adhered to said resilient support surface, said resilient wear surface comprising an underlying wear layer base coat and an overlying wear layer top coat adhered to said wear layer base coat, said wear layer top coat comprising a hard, thermoset, polymeric UV-curable blend of acrylic or acrylate monomers.

WO 095/11333 relates to resilient floor coverings which have a 5 to 150 μm hard topcoat consisting of an ionomer resin based on an olefin and an alpha, beta-unsaturated carboxylic acid overlying a 250 to 1250 μm wear layer consisting of a plasticized PVC composition. The hard topcoat has good clarity, resists yellowing, and provides good gloss retention and resistance to abrasion, scuffing, scratching and staining.

EP 1046688 discloses an aqueous coating composition comprising an aqueous dispersing material which is a copolymer having a glass transition temperature 80° C. or less which is obtained by the copolymerization a specific unsaturated carboxylic acid, (meth)acrylic acid alkyl ester, and other monomers and (B) a specific aminoalcohol compound in a specific proportion. The aqueous coating composition, comprising a polyethylene wax, exhibit superior durability and water resistance which are represented by black heel mark resistance and anti-scuff properties. The composition is particularly useful as a floor coating material.

CA2162487 discloses coating composition comprising:
(a) thermoplastic polymer comprising a polyvinyl chloride dispersion resin;
(b) from about 3% by weight to about 25% by weight of plasticizer for said thermoplastic polymer; and
(c) at least about 30% by weight of crosslinking agent, the weight ratio of said thermoplastic polymer to said crosslinking agent being no greater than about 2:1; Said coating compositions providing an excellent resistance to scuff, stain and gloss loss.

A major component of many current synthetic flooring compositions is polyvinyl chloride (PVC) which can be applied in various forms such as, e.g. plasticized PVC and PVC foam. As a matter of fact, PVC is widely used in flooring materials.

For environmental and other reasons, there is an on-going effort to develop alternative adequate resin compositions for flooring.

Consequently, even though PVC offers excellent properties in its application for floor coverings, the manufacturers of these coverings have been looking for a substitute for it.

In light of the growing environmental awareness, it is advantageous to use biobased materials, not usable for food production, such as cellulose esters, as raw material(s) for flooring applications providing the flooring with desirable physical and mechanical properties.

Cellulose esters are in general obtained from reaction of a carboxylic acid and cellulose. Techniques for the preparation of cellulose esters are for example disclosed in U.S. Pat. Nos. 2,093,462; 2,093,464; 2,126,460; 2,196,768; 3,022,287 and WO 92/05219.

A commercial source of cellulose esters is Eastman Chemical Products, Inc., Kingsport, Tenn. Preferred cellulose esters include cellulose acetate, cellulose propionate, cellulose butyrate, cellulose acetate propionate, cellulose acetate butyrate, and cellulose propionate butyrate.

The introduction of cellulose ester in sheets and multi-layer structures is subject to a limited number of patents.

WO 2018/017652 relates to calendared films or sheets comprising the cellulose ester compositions and processes for calendaring.

The cellulose ester composition comprises from 0 to 40% by weight, based on the total weight of the composition, of a plasticizer; from 0.1 to 2.0% by weight, based on the total weight of the composition, of a roll release agent; and from 0 to 6% by weight, based on the total weight of the composition, of a processing aid, said processing aid comprising an acrylic (co)polymer, a styrenic polymer, a carbonate polymer, a polyester polymer, an olefin polymer or a siloxane polymer.

US 2017/0259530 relates to an interlayer structure having a cellulose ester layer for use in structural laminates. The cellulose ester layer provides rigidity and support to multilayer interlayers comprising an array of different layers. The multilayer interlayer comprises:

a) a non-cellulose ester layer comprising a poly(vinyl acetal) resin or an ionomer resin;
b) a tie layer comprising a thermoplastic polymer resin selected from polyurethane resin or ethylene vinyl acetate resin; and
c) a cellulose ester layer comprising at least one cellulose ester having a hydroxyl content of at least 0.5 weight percent based on the entire weight of the cellulose ester, wherein said cellulose ester has a glass transition temperature of at least 50° C., wherein said tie layer is disposed between and in contact with the non-cellulose ester layer and said cellulose ester layer.

Of major concern for surface coverings comprising cellulose ester is the combination of scuff resistance and curling especially when the cellulose ester is a preponderant part of the top-layer Top-layer properties not only depend on the top-layer composition but also to a greater or lesser extent on the properties of the underlying layers This is particularly the case when dealing with scuff resistance and curling where there is still much room for improvement.

AIM OF THE INVENTION

The present invention aims to remedy the drawbacks and to meet the shortcomings of the nowaday's surface covering.

The present invention further aims to provide surface coverings comprising a substrate and a top-layer, said top-layer proving outstanding scuff resistance, said surface covering being exempt of curling, upon specific conditions of the flooring process and during its use.

SUMMARY OF THE INVENTION

The present invention discloses a surface covering in particular floor or wall covering, comprising:

a substrate A, having an upper and a lower surface, said substrate A being characterized by a deformation of less than 40 degrees, preferably of less than 30 degrees, more preferably of less than 20 degrees, most preferably of less than 10°, as measured for a rectangular substrate A sample with dimensions of 160 mm×450 mm, partially contacting and fixed in a horizontal position to a plate support, so that exactly a 160×300 mm part of said sample exceeds the edge of the plate support and is free of support during the deformation measurement, the deformation being recorded 30 seconds after removing means that prevent a deformation of the 160×300 mm part under the influence of its own weight, the deformation, being the angle, in degrees, between the horizontal position and the position after 30 seconds, of the extreme bottom edge of the freely suspended 160×300 mm part of said rectangular substrate sample A, free of support and deforming under its own weight away from the horizontal position;

a scuff resistant polymer layer B, having an upper and a lower surface, said polymer layer B comprising one or more polymer(s) C, said one or more polymer(s) C comprising more than 93.5% by weight of cellulose ester polymer(s); the lower surface of polymer layer B contacting and adhering to the upper surface of substrate A.

Preferred embodiments of the present invention disclose one or more of the following features:

substrate A comprises a layer selected from the group consisting of polymer, engineered wood, natural stone, agglomerated stone, ceramic, metal, fibrocement plate, hybrid polymer composite material and combinations thereof;

the cellulose ester polymer of polymer layer (B) comprises:
a pluratlity of C2-C5 alkanoyl substituents and
a plurality of hydroxyl substituents
wherein the degree of substitution of the hydroxyl substituents is in the range of from 0.3 to 1.0;

the cellulose ester of polymer layer B is selected from the group consisting of cellulose acetate, cellulose propionate, cellulose butyrate, cellulose acetate propionate, cellulose acetate butyrate and cellulose propionate butyrate;

the one or more polymer(s) C of the polymer layer B comprise more than 93.5% by weight of cellulose ester polymer(s), the remaining weight percentage being supplemented, up to 100% by weight of polymers, by one or more polymer(s) selected from the group consisting of (meth)acrylate comprising (co)polymers, vinyl alkanoate comprising (co)polymers, vinylacetals (co)polymers, polyether ester thermoplastic elastomers, (co)polyesters, (co)polyamides, polyurethanes, nitrile (co)polymers, styrene (co)polymers, vinylchloride (co)polymers, olefin (co)polymers, and ionomers;

polymer layer B comprises up to 100 parts by weight of plasticizer for 100 parts by weight of one or more polymer(s) C, said plasticizer being selected from the group consisting of dialkyl esters of aliphatic dicarboxylic acids; alkyl esters of aromatic mono- di-, tri-, or tetra-carboxylic acids; lower alkyl phosphates; lower alkyl-aryl phosphates; aryl phosphates; alkyl sulfonates; epoxidized or otherwise derivatized vegetable oils, citrate-based plasticizers and acetylated monoglycerides;

the surface covering comprises an additional polymer layer E, having an upper and a lower surface, the upper surface of additional polymer layer E contacting the lower surface of substrate A, said polymer layer E comprising one or more polymers selected from the group consisting of cellulose ester (co)polymers, (meth)acrylate comprising (co)polymers, vinyl alkanoate comprising (co)polymers, vinylacetals (co)polymers, polyether ester thermoplastic elastomers, (co) polyesters, (co)polyamides, polyurethanes, nitrile (co) polymers, styrene (co)polymers, vinylchloride (co) polymers, olefin (co)polymers, and ionomers;

the surface covering comprises a top-layer D contacting and adhering to the upper surface of scuff resistant polymer B;

the top-layer D comprises, as binder I., one or more polymer(s) selected from the group consisting of epoxy resin, epoxy ester resin, vinyl ester resin, polyester, alkyd resin, polyamide, polyurethane, polyether, (meth)acrylate (co)polymer, vinyl (co)polymer and aminoplast resin;

the top-layer (D) comprises:
up to 25% by weight of one or more types of microscale particle(s) II. with a volume median particle diameter (D50) comprised between 1 and 50 µm, preferably between 3 and 35 µm, more preferably 5 and 20 µm as obtained from laser light scattering measurements according to ISO 13320;
up to 20% by weight of one or more compound(s) III. selected from the group consisting of silicones, fluorocarbons, fluorinated silicones, hydrocarbons, natural waxes and synthetic waxes.
the top-layer D is a crosslinked layer;
the surface covering is characterized by a Scuff Resistance of 8 or higher, preferably of 10 or higher, more preferably of 12 or higher as assessed in a friction test apparatus with an Astral Rubber too;
the surface covering is characterized in that:
the thickness of substrate A is comprised between 0.5 and 15 mm, preferably between 1 and 10 mm, more preferably between 1.5 and 6 mm;
the thickness of polymer layer B is comprised between 0.05 and 3.0 mm, preferably between 0.1 and 2.0 mm, more preferably between 0.2 and 1.0 mm.

The present invention further discloses a process for the preparation of the surface covering comprising the steps of:
providing a substrate A;
laminating the composition comprising one or more polymer(s) C, said one or more polymer(s) C comprising more than 93.5% by weight of cellulose ester polymer(s) to the upper surface of substrate A;
fusing and gelling said composition to form polymer layer B.

Preferred embodiments of the process of the present invention disclose one or more of the following features:
a top-layer formulation is applied on the upper surface of polymer layer B;
the top-layer formulation is converted into top-layer D through subjecting said coating formulation to actinic radiation;
the actinic radiation is emitted by excimer lamps;
the top-layer formulation is polyurethane based.

BRIEF DESCRIPTION OF THE DRAWINGS

FIG. 1 shows the arrangement of the equipment for measuring the substrate A deformation.

KEY

1: plate support
2: rectangular substrate A sample with dimensions of 160×450 mm
3: fixing means (e.g. a 5 kg weight)
4: angle of deformation

DETAILED DESCRIPTION OF THE INVENTION

The present invention provides a surface covering comprising a substrate A and a polymer layer B, in contact with at least one surface of the substrate A.

The surface covering of the present invention comprises a substrate A having an upper and a lower surface, a scuff resistant polymer layer B, having an upper and a lower surface, an optional additional polymer layer E, having an upper and a lower surface, and an optional protecting top-layer D on the top surface.

wherein:
the lower surface of polymer layer B contacts the upper surface of substrate A,
the upper surface of the additional polymer layer E contacts the lower surface of substrate A,
the top-layer D contacting the upper surface of scuff resistant polymer layer B.

Substrate A of the surface covering of the present invention is characterized by a deformation of less than 40 degrees, preferably of less than 30 degrees, more preferably of less than 20 degrees, most preferably of less than 10. Hereto part of a rectangular substrate A sample with dimensions of 160 mm×450 mm is fixed in a horizontal position to a plate support, in such a way that an exactly 160×300 mm part of said substrate sample exceeds the edge of the plate support and is free of support during the deformation measurement. In general part of the substrate sample A is fixed to the plate support by a 5 kg weight, placed on the sample part in contact with the plate support. Means are provided to keep the 160×300 mm part of the substrate sample, exceeding the plate support in an exact horizontal position. Deformation of the substrate sample A is recorded 30 seconds after removing the means that prevent a deformation of the 160×300 mm part under the influence of its own weight, the deformation, being the angle, in degrees, between the horizontal position and the position after 30 seconds, of the extreme bottom edge of the freely suspended 160×300 mm part of said rectangular substrate sample A, free of support and deforming under its own weight away from the horizontal position.

The arrangement of equipment for measuring the deformation of substrate A is represented in FIG. 1.

Substrate A includes polymer, engineered wood, natural stone, agglomerated stone, ceramic, fibrocement plate, hybrid polymer composite material (comprising synthetic polymers and biological, inorganic or organic derived constituents) and combinations thereof.

Preferably substrate A is a multilayer substrate comprising one or more polymer layers, said polymer layers comprising one or more polymers selected from the group consisting of cellulose ester polymer(s), (meth)acrylate comprising (co) polymers, vinyl alkanoate comprising (co)polymers, vinylacetal (co)polymers, polyether ester thermoplastic elastomers, (co)polyesters, (co)polyamides, polyurethanes, nitrile (co)polymers, styrene (co)polymers, vinylchloride (co)polymers, olefin (co)polymers and ionomers.

Preferably the multilayer substrate A comprises a carrier such as a woven or non-woven mesh or fabric, or tissue of more or less thermally stable materials such as glass fiber mat (GFM).

Preferably, substrate A is are characterized by a Shore A hardness of at least 90, preferably of at least 95 and a Shore D hardness of at least 40, more preferably of at least 50, as determined according to ASTM D2240.

The carrier gives both strength and dimensional stability to the surface covering.

Advantageously the carrier comprises a glass-fiber mat and/or a non-woven characterized by an air permeability greater than 3000 l/m²·s, preferably comprised between 3000 and 15000 l/m²·s, and preferably comprised between 3500 and 10000 l/m²·s.

Polymer layer B comprises one or more polymers C, said one or more polymers C comprising more than 93.5% by weight of cellulose ester polymer(s) (i).

The cellulose ester polymer (i), for being used in polymer layer B comprises a plurality of $(C_{2-5})$ alkanoyl substituents chosen from acetyl, propanoyl, butyryl, isobutyryl, pivaloyl, pentanoyl or 3-methylbutanoyl. Preferably the ($C_{2-5}$) alkanoyl substituents are chosen from acetyl, propanoyl, butyryl.

Preferably the cellulose ester polymers comprise a plurality of ($C_{2-5}$) alkanoyl substituents and a plurality of hydroxyl substituents wherein the degree of substitution of the hydroxyl substituents is in the range of from 0.3 to 1.0, more preferably of from 0.4 to 0.9.

Preferably the cellulose ester polymer is selected from the group consisting of cellulose acetate, cellulose propionate, cellulose butyrate, cellulose acetate propionate, cellulose acetate butyrate and cellulose propionate butyrate.

The cellulose ester polymers are characterized by a number average molecular weight (Mn) in the range of from 10000 to 150000, preferably in the range of from 10000 to 100000, more preferably in the range of from 10000 to 80000.

Polymer layer B comprising one or more polymers C, said one or more polymer(s) C, comprising more than 93.5% by weight of cellulose ester polymer (i), further comprise(s) one or more polymers selected from the group consisting of (meth)acrylate comprising (co)polymers (ii), vinyl alkanoate comprising (co)polymers (iii), vinylacetal (co)polymers (iv), polyether ester thermoplastic elastomer(s) (v) (co) polyesters (vi), (co)polyamides (vii), polyurethanes (viii); nitrile (co)polymers (ix), styrene (co)polymers (x), vinylchloride (co)polymers (xi) olefin (co)polymers (xii) and ionomers (xiii).

The (meth)acrylate comprising polymers (ii) optionally used in polymer layer B are selected from the group consisting of alkyl(meth)acrylate homopolymers and random copolymers (ii.a); alkyl(meth)acrylate block copolymers (ii.b); alkene/alkyl(meth)acrylate copolymers (ii.c); alkene/alkyl(meth)acrylate/carbon monoxide copolymers (ii.d) and mixtures thereof.

The alkyl(meth)acrylate (co)polymers (ii.a) comprise homopolymers of methyl methacrylate and/or random copolymers of methyl methacrylate and $C_1$ to $C_8$ alkyl (meth) acrylate, said copolymers containing at least 60% by weight, preferably at least 70% by weight, more preferably at least 80 parts by weight of methyl methacrylate.

Poly(methyl methacrylate) (PMMA) is preferably used.

The alkyl (meth)acrylate block copolymers (ii.b) comprise from 10 to 90% by weight, preferably from 20 to 80% by weight of one or more block(s) comprising $C_1$-$C_8$ alkyl methacrylate monomers and from 90 to 10% by weight, preferably from 80 to 20% by weight of one or more blocks comprising $C_1$-$C_8$ alkyl acrylate monomers.

Preferably the alkyl (meth)acrylate block copolymer is a di-block copolymer comprising a block comprising alkyl acrylate monomers and a block comprising alkyl methacrylate monomers such as for example a di-block copolymer comprising a block comprising n-butyl acrylate monomers and a block comprising methyl methacrylate monomers.

The alkyl (meth)acrylate copolymer more preferably is a tri-block copolymer comprising one block comprising alkyl acrylate monomers and two blocks comprising alkyl methacrylate monomers such as for example a tri-block copolymer comprising one block comprising n-butyl acrylate monomers and two blocks comprising methyl methacrylate monomers.

The alkene/alkyl(meth)acrylate copolymers (ii.c) comprise from 50 to 95% by weight of one or more alkenes and from 5 to 50% by weight of one or more $C_1$-$C_8$ alkyl (meth) acrylates wherein the one or more alkenes are defined by the general formula $R_1R_2C\!=\!CR_3R_4$, wherein $R_1$, $R_2$, $R_3$ and $R_4$ independently is a hydrogen or an alkyl radical containing from 1 to 4 carbon atoms and are preferably selected from the group consisting of ethene, propene, 1-butene, 1-pentene, 1-hexene, 2-methyl-1-butene, 2,3-dimethyl-1-pentene.

Preferably the alkene/alkyl(meth)acrylate copolymer is an ethylene/methylacrylate or an ethylene/butylacrylate copolymer.

The alkene/alkyl(meth)acrylate/carbon monoxide copolymers (ii.d) comprise from 40 to 80% by weight of one or more alkenes and from 5 to 60% by weight of one or more $C_1$-$C_8$ alkyl (meth)acrylates and from 3 to 30% by weight of carbon monoxide wherein the one or more alkenes are those as defined in (ii.c).

Preferably the alkene/alkyl(meth)acrylate/carbon monoxide copolymer (ii.d) is an ethylene/ethyl acrylate/carbon monoxide, an ethylene/n-butyl acrylate/carbon monoxide or an ethylene/2-ethylhexyl acrylate/carbon monoxide copolymer.

The vinyl alkanoate comprising polymers (iii) optionally used in polymer layer B are selected from the group consisting of vinyl alkanoate homo- and copolymers (iii.a), alkene/vinyl alkanoate copolymers (iii.b), alkene/vinyl alkanoate/carbon monoxide copolymers (iii.c) and mixtures thereof.

The vinyl alkanoate comprising homo- and copolymers (iii.a) comprise one or more vinyl alkanoate monomer(s), defined by the general formula $RCOOCH\!=\!CH_2$, wherein R is an alkyl radical containing from 1 to 20 carbon atoms, and are preferably selected from the group consisting of vinyl formate, vinyl acetate, vinyl propionate, vinyl butyrate, vinyl octanoate and vinyl stearate Preferably the vinyl alkanoate comprising copolymers (iii.a) comprise at least 60% by weight, more preferably at least 70% by weight, most preferably at least 80% by weight or even at least 90% by weight of vinyl acetate. Preferably the vinyl alkanoate polymer is polyvinyl acetate.

The alkene/vinyl alkanoate copolymers (iii.b) comprise one or more alkenes and one or more vinyl alkanoate(s) wherein the one or more alkenes are defined as in (ii.c) and wherein the one or more vinyl alkanoate monomer(s) are defined as in the vinyl alkanoate homo- and copolymers (iii.a).

Preferably the alkene/vinyl alkanoate copolymer (iii.b) comprises at least 60% by weight, more preferably at least 70% by weight, most preferably at least 80% by weight or even at least 85% by weight of one or more vinyl alkanoate(s) and 40% or less, preferably 30% or less, more preferably 20% or less, most preferably 15% or less of one or more 1-alkene(s).

Preferably the alkene/vinyl alkanoate copolymer (iii.b) is an ethylene/vinyl acetate copolymer comprising at least 60% by weight, preferably at least 70% by weight, more preferably at least 80% by weight, most preferably at least 85% by weight of vinyl acetate.

The alkene/vinyl alkanoate/carbon monoxide copolymers (iii.c) comprise 40 to 80% by weight of one or more alkenes, 5 to 60% by weight of one or more vinyl alkanoates and 3 to 30% by weight of carbon monoxide, wherein the one or more alkenes and the one or more vinyl alkanoates are defined as in the alkene/vinyl alkanoate copolymers (iii.b).

Preferably the alkene/vinyl alkanoate/carbon monoxide copolymer (iii.c) is an ethylene/vinyl acetate/carbon monoxide copolymer.

The vinylacetal (co)polymers (iv) optionally used in polymer blend B of the present invention are selected from the group consisting of polyvinylbutyral, polyvinylethyral, polyvinylformal, polyvinylpropyral, and copolymers containing two or more different vinylacetal units such as poly(vinylethyral-vinylbutyral). Vinylacetal (co)polymers are always copolymers with vinyl alcohol units, since the reaction of polyvinyl alcohol to the full acetal is not complete, for statistical and steric reasons; in general the residual OH content is between 10 and 30% by weight.

Preferably the vinylacetal (co)polymer (iv) is polyvinyl butyral.

Polyvinyl butyral may be polyvinyl butyral which has not been used previously, but preferably is recovered or recycled, providing a lower cost but an equally high quality raw material. The kind of recovered or recycled polyvinyl butyral is not critical. It has been found that recovered or recycled polyvinyl butyral of different kinds and from different manufacturing origins, as well as mixtures of different kinds of polyvinyl butyral, are suitable for use in accordance to this invention.

The polyether ester thermoplastic elastomer (v) optionally used in polymer layer B preferably is prepared from a dicarboxylic acid, a lower alkyl diol and a polyalkylene ether diol, wherein:

the dicarboxylic acid is selected from the group consisting of terephthalic acid; isophthalic acid; 2,6-naphthalene dicarboxylic acid; 4,4'-biphenyl dicarboxylic acid; 2,5-furandicarboxylic acid; 1,4-cyclohexane dicarboxylic acid and mixtures thereof;

the lower alkyl diol is selected from the group consisting of ethylene glycol, 1,3-propanediol; 1,4-butanediol; 1,4-cyclohexanedimethanol and mixtures thereof, and;

the polyalkylene ether diol is selected from the group consisting of polyethylene ether glycol, polypropylene ether glycol, polytetramethylene ether glycol, hexamethylene ether glycol and mixtures thereof.

The polyalkylene ether diol of polyether ester (v) is characterized by a number average molecular weight of at least 1000 g/mole, preferably comprised between 1000 and 5000 g/mole, more preferably comprised between 1500 and 3500 g/mole.

Polyether ester thermoplastic elastomer (v) preferably comprises from 60 to 85% by weight of polyalkylene ether ester segments and from 15 to 40% by weight of lower alkyl ester segments.

Polyether ester thermoplastic elastomer (v), preferably used in polymer layer B, of the present invention is poly(butylene terephthalate)-block-poly(tetra methylene oxide) and poly(butylene 2,5-furadicarboxylate)-block-poly(tetra methylene oxide).

The (co)polyester (vi) optionally used in polymer layer B preferably are obtained from the condensation of one or more diol(s) such as ethylene glycol, 1,3-propanediol, 1,4-butanediol, or 1,4 cyclohexanedimethanol with one or more diacid(s) such as terephthalic acid, isophthalic acid, 2,6 naphthalenedicarboxylic acid, 2,5-furandicarboxylic acid, succinic acid, adipic acid, sebacic acid, fumaric acid or maleic acid, or from the condensation of an hydroxycarboxylic acid such as lactic acid. Optionally polyester (vi) may comprise a blend of polyesters such as for example a blend of polyethylene terephthalate or polyethylene 2,5-furandicarboxylate and polybutylene 2,6-naphthalenedicarboxylate.

Preferably the (co)polyester (vi) comprises polyethylene terephthalate, polyethylene 2,5-furandicarboxylate or a copolyester thereof or polylactic acid.

Polylactic acid, refers to a thermoplastic polyester derived from 2-hydroxy lactate (lactic acid) or lactide (cyclic diester). The formula of the subunit is: —[O—CH(CH$_3$)—CO]—. Polylactic acid is typically selected from the group consisting of D-polylactic acid, L-polylactic acid, D,L-polylactic acid, meso-polylactic acid, and any combination thereof.

Polylactic acid in general is classified into crystalline polylactic acid and amorphous polylactic acid. The amorphous character increases as the racemic content increases. Typically polylactic acid, for being used in polymer blend B is an amorphous resin, possibly comprising some crystallinity.

The polyamide (vii) optionally used in polymer layer is selected from the group consisting of nylon 6, nylon 9, nylon 11, nylon 12, nylon 66, nylon 69, nylon 610, nylon 612, nylon 6/12, nylon 6/66, nylon 6/69, nylon 66/610, nylon 66/6, nylon 6T, nylon 12T, nylon MXD6, nylon MXD6/MXDI, nylon 6I/6T and blends thereof.

The polyurethane (viii), optionally used in polymer layer B, contains hard and soft segments formed respectively of polymerized diisocyanate and polyol components. The ratio or weight % of hard to soft segments determines the physical properties of the thermoplastic polyurethane TPU.

The thermoplastic polyurethane (viii) is obtained from reaction of a diisocyanate compound with at least one difunctional compound capable of reacting with an isocyanate group, preferably at least one difunctional hydroxyl group comprising compound and optionally a chain extender.

Suitable chain extenders include aliphatic diol(s) such as 1,4-butanediol or 1,6-hexanediol; aminoalcohol(s) such as ethanolamine; and aliphatic diamines such as 1,6-hexamethylenediamine and isophoronediamine.

The difunctional compound capable of reacting with an isocyanate group preferably is a difunctional hydroxyl group comprising compound comprising a structure selected from the group consisting of polyesteramide, polythioether, polycarbonate, polyacetal, polyolefin, polysiloxane, polyesters, polyether, polycaprolactone and mixtures thereof.

Preferred difunctional hydroxyl group comprising compounds are polyesters, more particularly these obtained from the condensation of linear diacids and linear diols and polyethers, such as polytetraalkylene ether where alkylene is $C_1$ to $C_4$.

The diisocyanate compound may be aromatic or aliphatic. Aromatic diisocyanates include, for example, 4,4'-, 2,2'- and 2,4'-methylene diphenyl diisocyanate and toluene diisocyanate; aliphatic diisocyanates include, for example, 1,6-hexamethylene diisocyanate, isophorone diisocyanate and 2,2'-, 4,4'- and 2,4'-dicyclohexylmethane diisocyanate. Mixtures of aromatic and aliphatic diisocyanates may be used.

Preferred isocyanates are methylene diphenyl diisocyanate and 4,4'-dicyclohexylmethane diisocyanate.

The thermoplastic polyurethanes preferably are characterized by a Shore A hardness of at least 30 and a Shore D hardness of 95 or less, as determined according to ASTM D2240.

Examples of thermoplastic polyurethanes suitable for being used in the polymer blend B include Epamould (Epaflex Polyurethanes), Laripur (Coim S.p.A.), Apilon (Api Plastic S.p.A.), Estane and Pearlcoat/Pearlthane/Pearlbond (Lubrizol), Avalon (Huntsman Polyurethanes), Elastollan (BASF) and Pellethane (Dow Chemical Co).

The polyurethanes optionally used in polymer layer B, can also be a crosslinkable polyurethane (thermoset).

The nitrile (co)polymers (ix) include those containing polymerized nitrile monomer and one or more polymerized monomers chosen from (meth)acrylate esters, vinyl esters, vinyl aromatics, vinyl amides, vinyl halides, alkenes and monomers including those having at least two vinyl groups per molecule such as allyl (meth)acrylate. Preferred nitrile monomers are acrylonitrile and methacrylonitrile and alpha-chloro acrylonitrile; most preferred is acrylonitrile.

The styrene (co)polymers (x) include polystyrene and copolymers comprising polymerized styrene and one or more polymerized monomers chosen from alpha-methylstyrene, nitrile monomers, alkenes, alkylenes, alkyl(meth)acrylates orN-phenylmaleimide.

Vinylchloride (co)polymers (xi) include polyvinylchloride and copolymers containing polymerized vinylchloride and one or more polymerized monomers chosen from esters of unsaturated mono- or polycarboxylic acids, vinyl esters, vinyl aromatics, vinyl amides, or alkenes.

Olefin (co)polymers (xii) include C2-C8 homopolymers, C2-C8 olefin copolymers and C2-C8 copolymers comprising copolymerized monomers chosen from the group consisting of unsaturated mono- or polycarboxylic acids, vinyl acetate, vinyl alcohol, monovinylarene and mixtures thereof.

Ionomers (xiii) include copolymers of alkene and unsaturated mono- or polycarboxylic acids; alkylene and unsaturated mono- or polycarboxylic acids, monovinylarene and unsaturated mono- or polycarboxylic acids wherein the cation of the carboxylate anion is chosen from the alkali metals, alkaline earth metals, transition metals and ammonium.

Preferably the one or more polymer(s) C of the polymer layer B comprise more than 93.5% by weight of cellulose ester polymer(s) (i), the remaining weight percentage being supplemented, up to 100% by weight of polymers, by of one or more polymers selected from the group consisting of (meth)acrylate comprising (co)polymers (ii), vinyl alkanoate comprising (co)polymers (iii), vinylacetal (co)polymers (iv), polyether ester thermoplastic elastomers (v) (co)polyesters (vi), (co)polyamides (vii), polyurethanes (viii); nitrile (co)polymers (ix), styrene (co)polymers (x), vinylchloride (co)polymers (xi) olefin (co)polymers (xii) and ionomers (xiii).

Polymer layer B further comprises ingredients such as plasticizers, preferably bioplasticizers, and one or more additives, such as, modifying resins, thermal and light stabilizers, flame retardants, or any combination thereof.

Any plasticizer capable of plasticizing the composition comprising cellulose ester polymer (i) and non-cellulose ester polymer (ii to xiii) can be used. Suitable plasticizers are selected from the group consisting of dialkyl esters of cyclohexane dicarboxylic acids; dialkyl esters of aliphatic dicarboxylic acids; alkyl esters of aromatic mono- di-, tri-, or tetra-carboxylic acids; lower alkyl citrates; lower alkyl phosphates; lower alkyl-aryl phosphates; aryl phosphates; alkyl sulfonates and other plasticizers used in conventional polyvinyl chloride applications.

Preferably the plasticizers comprise alkyl esters of polycarboxylic acids, more preferably alkyl esters of aromatic polycarboxylic acids.

Preferably the plasticizer is a dialkyl ester of poly(alkyleneglycol) such as for example triethylene glycol bis(2-ethylhexanoate).

Preferably the plasticizers comprise an epoxidized or otherwise derivatized vegetable oils, for example epoxidized soybean oils such as epoxidized $C_1$-$C_{10}$ alkyl soyate, epoxidized linseed oil, epoxidized soy oil, epoxidized tall oil and the like.

Preferably the plasticizer is an ecologically friendly citrate-based plasticizer that includes a blend of citrate and derivatized vegetable oil.

Preferably the plasticizer is an acetylated monoglyceride such as for example the acetylated monoglyceride of ricinoleic acid.

The plasticizer is typically present in an amount of up to 100 parts by weight, preferably from 2 to 100 parts by weight, more preferably from 3 to 70 parts by weight, most preferably from 4 to 55 parts by weight or even from 5 to 40 parts by weight, for 100 parts by weight of the one or more polymer(s) C.

Polymer layer B preferably comprises one or more antioxidants in an amount comprised between 0.01 to 3 parts by weight, preferably from 0.1 to 2 parts by weight, for 100 parts by weight of one or more polymer(s) C.

The antioxidant comprises one or more sterically hindered phenols or a mixture of one or more sterically hindered phenols and one or more phosphites.

The sterically hindered phenols, preferably are octadecyl-3-(3,5-di-t-butyl-4-hydroxyphenyl)propionate (Irganox® 1076); pentaerythritoltetrakis[3-(3,5-di-t-butyl-4-hydroxyphenyl)propionate] (Irganox® 1010) both supplied from BASF; and 4,4'-methylene-bis(2,6-di-t-butylphenol).

The phosphites preferably are trisnonylphenyl phosphite (Weston® TNPP) supplied from Addivant™; tris (2,4-di-t-butylphenyl)phosphite (Irgafos® 168) supplied from BASF, Ltd. and bis(2,4-di-t-butylphenylpentaerythritol) diphosphate (Everfos®-626) supplied from Everspring Chemical Co., Ltd.

The composition of the polymer layer B of the present invention preferably comprises one or more light stabilizers in an amount comprised between 0.01 to 3 parts by weight, preferably from 0.1 to 2 parts by weight, for 100 parts by weight of one or more polymer(s) C. The light stabilizers are preferably chosen from benzophenones, such as Chimassorb® 81 FL; benzotriazoles, such Tinuvin® 326 FL and Tinuvin® 360; hydroxyphenyltriazines, such as Tinuvin® 1577 ED and Tinuvin® 600; cyanoacrylates such as Uvinul® 3030; oxanilides such as Tinuvin® 312 and hindred amines such as Chimassorb® 944 FLD and Tinuvin® PA 123, all supplied from BASF.

Polymer layer B preferably comprises one or more light flame retardants in an amount comprised between 0.2 to 40 parts by weight, for 100 parts of the one or more polymer(s) C. The flame retardants are preferably chosen from phosphorus comprising organic compounds, such as organophosphates, phosphonates and phosphinates; halogenated compounds; halogenated organophosphates and mineral flame retardants.

Examples of an organophosphate are triphenylphosphate or resorcinol bis(diphenylphosphate); an example of phosphonate is dimethyl methylphosphonate; an example of phosphinate is aluminum diethylphosphinate; examples of halogenated compounds are hexabromocyclododecane or polymeric/oligomeric brominated compounds; an example of halogenated organophosphorus compound is tris(1,3-dichloro-2-propyl)phosphate; examples of mineral compounds are magnesium hydroxide, aluminum hydroxide, zinc hydroxide; borates such as zinc borate and inorganic phosphorus compounds such as ammonium polyphosphate.

Polymer layer B further may comprise one or more lubricants of the stearic acid type, the fatty acid ester type, the fatty acid amide type, the paraffin hydrocarbon type, the naphtenic hydrocarbon type, the metal soap type, the silicone type, polyethylene glycol type and waxes, used alone or as a mixture. Preferred lubricants comprise a mixture of stearic acid type and silicone type lubricants.

Preferred lubricants are chosen from stearic acid and/or zinc stearate.

Preferred silicone type lubricants include siloxane homopolymers or copolymers comprising dimethylsiloxane units, methylhydrogen siloxane units, diphenylsiloxane units, phenylmethylsiloxane units, dimethylhydrogen siloxane units and trimethylsiloxane units. A preferred silicone is polydimethylsiloxane.

Polymer layer B may comprise lubricants in an amount up to 10 parts by weight, preferably in an amount comprised between 0.5 and 5 parts by weight, more preferably between 1.5 and 4.5 parts by weight, most preferably between 2 and 4 parts by weight for 100 parts of the one or more polymer(s) C.

Polymer layer B of the present invention further comprises one or more fillers in an amount comprised between 50 and 500 parts by weight, preferably between 75 and 350 parts by weight, more preferably between 100 and 300 parts by weight for 100 parts by weight of the one or more polymer(s) C.

Examples of fillers can be any conventional filler, especially those types traditionally used in surface coverings.

The filler can be organic, inorganic, or a combination of both, such as with different morphologies. Examples include, but are not limited to, coal fly ash, carbonate salts such as magnesium carbonate, calcium carbonate and calcium-magnesium carbonate, barium sulfate, carbon black, metal oxides, inorganic material, natural material, alumina trihydrate, magnesium hydroxide, bauxite, talc, mica, dolomite, barite, kaolin, silica, post-consumer glass, or post-industrial glass, synthetic and natural fiber, preferably cellulose fiber, or any combination thereof.

Preferably the filler comprises talc, mica, calcium carbonate, magnesium carbonate, dolomite, barite, bauxite, magnesium hydroxide, kaolin, silica, glass, or any combination thereof.

Preferably the filler comprises cellulose fiber.

Preferably the surface covering comprises an additional polymer layer E having an upper and a lower surface, the upper surface of additional polymer layer E contacting the lower surface op substrate A.

The additional polymer layer E preferably comprising one or more polymers selected from the group consisting of cellulose ester polymer(s) (i), (meth)acrylate comprising (co)polymers (ii), vinyl alkanoate comprising (co)polymers (iii), vinylacetal (co)polymers (iv), polyether ester thermoplastic elastomers (v) (co)polyesters (vi), (co)polyamides (vii), polyurethanes (viii); nitrile (co)polymers (ix), styrene (co)polymers (x), vinylchloride (co)polymers (xi) olefin (co)polymers (xii) and ionomers (xiii).

Preferably polymer layer B comprises a protecting top-layer D on the top surface.

The top-layer D may be obtained from curing of one or more coating composition(s), said coating compositions comprising:
  from 40 to 99% by weight preferably from 40 to 95% by weight of a binder I.;
  up to 25% by weight preferably from 0.5 to 25% by weight of one or more types of micro-scale particle(s) II. with a volume median particle diameter (D50) comprised between 1 and 50 µm, preferably between 3 and 35 µm, more preferably between 5 and 20 µm;
  up to 20% by weight, preferably from 0.1 to 20% by weight of one or more compounds III., selected from the group consisting of silicones, fluorocarbons, fluorinated silicones, hydrocarbons, natural waxes and synthetic waxes.

By coating composition the present invention means solvent-borne, waterborne, high solid and powder compositions.

By curing the present invention means the transition from the liquid to the solid state through evaporation and/or chemical crosslinking.

By chemical crosslinking the present invention means oxygen crosslinking, moisture crosslinking, peroxide based radical crosslinking, and crosslinking through the reaction of co-reactable functional groups including self-condensation.

In general the chemical crosslinking is temperature and or radiation activated.

By thermally activated the present invention means that the conversion proceeds at room temperature or higher temperature within a reasonable time frame, compatible with the overall production process of the surface coverings.

By radiation activated crosslinking the present invention means that conversion is initiated by ultra violet (UV) or electron (EB) irradiation.

The binder I. of the coating composition of the present invention preferably comprises polymers selected from the group consisting of polyester, polyether, polyurethane, (meth)acrylate (co)polymer, vinyl alkanoate (co)polymer, (hydrogenated) bisphenol resin, novolac resin, epoxy ester resin, vinyl ester resin, polyamide, aminoplast resin, alkyd resin and mixtures thereof.

The polyesters for being used in the binder I. in general are hydroxyl functional polyesters, obtained from reaction of a molar excess of polyols on polyacids, or carboxyl functional polyesters obtained from reaction of a molar excess of polyacids on polyols.

Examples of polyols for being used in the polyesters of the present invention are ethylene glycol, 1,2-propylene glycol, 1,3-propylene glycol, 1,2-butanediol 1,3-butanediol, 1,4-butanediol, 1,5-pentanediol, neopentyl glycol, diethylene glycol, triethylene glycol, cyclohexane-dimethanol, glycerol, trimethylolethane, trimethylolpropane and tris-2-hydroxyethyl isocyanurate, Examples of polyacids for being used in the polyesters of the present invention are phthalic acid, isophthalic acid, terephthalic acid, 2,5-furandicarboxylic acid, succinic acid, glutaric acid, adipic acid, pimelic acid, suberic acid, azelaic acid, sebacic acid, undecanedioic acid, dodecanedioic acid, fumaric acid, malonic acid, itaconic acid, trimellitic acid, and corresponding anhydrides.

Polyethers for being used in the binder I. preferably are polyether polyols, in general having a degree of ethoxylation of from 10 to 20, the degree of ethoxylation indicating the number of moles of ethylene oxide that have on average been added onto 1 mole of a polyhydric alcohol, used as the starter molecule in accordance with well-known methods.

Besides ethylene oxide, minor amounts of propylene oxide may be used for the alkoxylation of the polyhydric alcohol.

The polyurethanes for being used in the binder I. are hydroxyl functional polyurethanes obtained from reaction of a molar excess of polyols on polyisocyanates, or isocyanate functional polyurethanes obtained from reaction of a molar excess of polyisocyanates on polyols.

Examples of polyisocyanates are 1,3-cyclopentane, 1,4-cyclohexane and 1,2-cyclohexane diisocyanate, 4,4'-methylene-bis(cyclohexyl isocyanate) and isophorone diisocyanate (IPDI), 2-methylpentamethylene 1,5-diisocyanate (MPDI), hexamethylene diisocyanate (HDI), trimethylhexamethylene 1,6-diisocyanate (TMDI), in particular 2,2,4- and the 2,4,4 isomer and technical mixtures of both isomers.

Examples of polyols are ethylene glycol, 1,2-propylene glycol, 1,4-butanediol, neopentyl glycol, hexanediol, trimethylolpropane and oligomeric and/or polymeric hydroxyfunctional compounds such as for example, polyesters, polyethers, silicon comprising polyols, rubber polyols, polyether-esters, polycarbonates, polyether carbonate polyols and polycarbonate polyesters.

The (meth)acrylate copolymers for being used in the binder I. preferably are hydroxyl-, carboxyl, epoxy- or isocyanato functionalized and may be obtained from the radical polymerization of (meth)acrylate alkyl ester having from 2 to 26 carbon atoms in the alkyl group and (meth)acrylic monomers comprising an epoxy group such as glycidyl(meth)acrylate, an acid group such as (meth)acrylic acid an hydroxyl group such as hydroxyethyl(meth)acrylic or an isocyanate group such as 1-(1-isocyanato-1-methylethyl)-4-(1-methylethenyl) benzene. The (meth)acrylate copolymers may be converted into ethylenically unsaturated group functionalized (meth)acrylate copolymers for example through reaction of epoxy functional (meth)acrylic copolymer with (meth)acrylic acid.

Vinyl alkanoate copolymers for being used in the binder I. preferably are hydroxyl or carboxyl functional and may be obtained from the radical copolymerization of vinyl esters of carboxylic acids, vinyl ethers of alcohols, vinyl aromatics, non-aromatic hydrocarbons having at least two conjugated double bonds, C1-C8 alkenes, hydroxyalkyl(meth)acrylates or ethylenically unsaturated carboxylic acids, among others.

The (hydrogenated) bisphenol resins, in general are (hydrogenated) bisphenol-A or (hydrogenated) bisphenol-F epoxies; the novolac resins are novolac epoxies.

Vinyl ester resins preferably are obtained from reaction of (meth)acrylic acid with epoxy resins or from reaction of hydroxalkyl(meth)acrylate with a carboxyl functional polyester or acrylic copolymer.

Epoxy ester resins preferably are obtained from reaction of fatty acids with epoxy resins.

Alkyd resins for being used in the binder I. are obtained from the condensation of a polyol such as glycerol, a polyacid or its anhydride, such as phthalic anhydride, and a monoacid such as linolenic acid.

Compounds, generally called crosslinker, comprising functional groups reactable with the hydroxyl functional groups of the hydroxyl functional polyesters, polyethers, polyurethanes, acrylic copolymers, vinyl ester resins and alkyds, preferably are polyisocyanates, aminoplasts or carbodiimides.

Examples of suitable isocyanate crosslinkers are hexamethylene diisocyanate, isophorone diisocyanate, 4,4'-diisocyanato-dicyclohexylmethane, tetramethylene diisocyanate, 2-methylpentamethylene diisocyanate, 2,2,4- and 2,4,4-trimethylhexam ethylene diisocyanate, 1,4-diisocyanato-cyclohexane, 3-isocyanatomethyl-1-methyl-1-isocyanato-cyclohexane, tetramethyl-m- or p-xylylene diisocyanate, 1,4- and 1,3-xylylene diisocyanate, hexahydroxylylene diisocyanate) and mixtures thereof. The polyisocyanates based on hexamethylene diisocyanate, isophorone diisocyanate and 4,4'-diisocyanatodicyclohexyl-methane.

Examples of suitable aminoplasts are partially or substantially methylolated urea-formaldehyde and melamine-formaldehyde. Preferably, highly methylolated melamine, such as hexamethoxymethyl melamine is used.

The carbodiimide crosslinker preferably consists of a condensate through decarboxylation reaction between one or more isocyanates wherein the condensate may be blocked with a hydrophilic group at terminal isocyanate groups thereof.

Crosslinkers for the carboxyl functional polyesters, acrylic copolymers and vinyl ester resins, preferably are epoxy functional group comprising compounds such as bisphenol A or F type epoxy resins, epoxy novolac resins and glycidyl group comprising acrylic copolymers.

Crosslinkers for the bisphenol A or F type epoxy resins, epoxy novolac resins, glycidyl group comprising acrylic copolymers and epoxy ester resins preferably are amine-based curing agents such as aliphatic polyamines, polyamine adducts, polyamide/amidoamines, aromatic amines, ketimines and cycloaliphatic amines or polycarboxylic acid-based curing agents, such as 2,3,5-hexanetricarboxylic acid.

Crosslinkers for the isocyanate functional polyurethanes and acrylic copolymers are polyols such as glycerol, or trimethylol propane and water (moisture curable).

Alkyd resins and the epoxy ester resins may react with oxygen in order to become crosslinked.

Vinyl ester resins, ethylenically unsaturated group functionalized (meth)acrylate copolymers and unsaturated polyesters may be crosslinked via a radical mechanism by adding peroxides such as tertiary-butyl peroxy-3,5,5-trimethylhexanoate, di-tertiary-butyl peroxide, benzoyl peroxide, tertiary-butyl perbenzoate, di-2-ethylhexyl peroxydicarbonate, tertiary-butyl hydroperoxide and accelerator such as cobalt octoate to the coating composition.

Dependent on the reactivity of the binder, said binder is supplied as a 1K or 2-K system; in a 2-K system the co-reactable compounds of the binder are admixed just before its application such as may for example be the case for polyurethane and epoxy coating compositions.

As is known in the art, additional additives can be used. Such additives include dispersing agents, flow aid agents, thickening agents, defoaming agents, deaerating agents, pigments, fillers, flattening agents, matting agents and wetting agents.

Preferably the coating composition is a radiation curable coating composition, wherein cross-linking is obtained through the influence of actinic irradiation, more preferably actinic radiation emitted by excimer lamps.

The radiation curable coating composition preferably comprises an ethylenically unsaturated group comprising polyurethane, polyester, polyether, (meth)acrylate (co)polymer, (hydrogenated) bisphenol based resin, novolac resin and mixtures thereof and one or more ethylenically unsaturated oligomers and/or monomers and optionally one or more photoinitiators and photoactivators and optionally an acidic adhesion promotor.

The acidic adhesion promoting resins used in accordance with the invention, generally comprise one or more acid functionality and one or more (meth)acrylic functionality. The one or more acid functionality is selected from the group consisting of —$SO_3H$, —$OSO_3H$, —COOH, —$OPO_3H_2$ and —$OPO_2HO$—. Optionally the acidic hydrogen is substituted by an alkali metal or an ammonium base.

Photoinitiators that can be used in the radiation curable coating composition of the invention, can be substantially any photoinitiator.

The usual photoinitiators that generate free radicals when exposed to radiation energy include, for example, aromatic ketone compounds, such as benzophenones, alkylbenzophenones, Michler's ketone, anthrone halogenated benzophenones.

There are several suitable photoinitiators commercially available from IGM including Irgacure 184 (1-hydroxycyclohexyl-phenyl-ketone), Irgacure 819 (bis(2,4,6-trimethylbenzoyl)-phenylphosphineoxide), Irgacure 1850 (a 50/50 mixture of bis(2,6-dimethoxybenzoyl)-2,4,4-trimethylpentyl-phosphine oxide and 1-hydroxy-cyclohexyl-phenyl-ketone), Irgacure 1700 (a 25/75 mixture of bis(2,6-dimethoxybenzoyl)-2,4,4-trimethylpentyl-phosphine oxide and 2-hydroxy-2-methyl-1-phenyl-propan-1-one), Irgacure 907 (2-methyl-1 [4-(methylthio)phenyl]-2-morpholonopropan-1-one), Darocur MBF (a phenyl glyoxylic acid methyl ester), Irgacure 2020 Photoinitiator blend (20% by weight of phenylbis(2,3,6-trimethyl benzoyl)phosphine oxide and 80% by weight of 2-hydroxy-2-methyl-1-phenyl-1-propanone) and Darocur 4265 (a 50/50 mixture of bis(2,4,6-trimethylbenzoyl)-phenylphosphineoxide and 2-hydroxy-2-methyl-1-phenyl-propan-1-one). The foregoing lists are meant to be illustrative only and are not meant to exclude any suitable photoinitiators.

Photoactivators are well known in the art and are for example chosen from methylamine, tributylamine, methyldiethanolamine, 2-am inoethylethanolamine, allylamine, cyclohexylamine, cyclopentadienylamine, diphenylamine, ditolylamine, trixylylamine, tribenzylamine, n-cyclohexylethyleneimine, piperidine, N-methylpiperazine, 2,2-dimethyl-1,3-bis(3-N-morpholinyl)-propionyloxypropane, and mixtures thereof.

Preferably the radiation curable coating composition comprises an ethylenically unsaturated polyurethane, in generally obtained from the reaction of:
a) at least one polyisocyanate,
b) at least one polymerizable ethylenically unsaturated compound containing at least one reactive group capable to react with isocyanate groups and
c) at least one compound which differs from compound (b) containing at least one reactive group capable to react with isocyanate groups.

The microscale particles II. optionally used in the coating composition of the present invention include glass spheres, plastic particles such as polyamide or polytetrafluorethylene particles, silicon carbide, metal oxides, or salts thereof. Non-limiting examples of suitable metal oxides include silicon oxide, aluminum oxide, tin oxide, zinc oxide, bismuth oxide, titanium oxide, zirconium oxide, lanthanide ("rare-earth") oxides, mixtures thereof, and the like; other suitable metal salts such as calcium carbonate, calcium aluminate, magnesium aluminosilicate, potassium titanate, cerium ortho-phosphate, hydrated aluminum silicate, metal salt clays such as montmorillonite, illite, kaolin clay, halloysite, mixtures thereof, and the like; and mixtures of metal oxides with metal salts.

The micro-scale particles II. may be used in combination with one or more nano-scale particles. The term "nano-scale particles" refers to particles having a volume median particle diameter (D50) of about 1 to about 100 nm.

The volume median particle diameter (D50) in general is measured by laser light scattering using the particle size analyzer (HORIBA 920) from (Horiba Scientific) according to ISO 13320.

The micro-scale particles II. preferably comprise a coating selected from the group consisting of ester-, vinyl ester-, amide-, urethane-, (meth)acrylate- and epoxy-based coatings.

The one or more compounds III., optionally used in the coating composition of the present invention, are selected from the group consisting of silicones, fluorocarbons, fluorinated silicones, hydrocarbons, natural waxes and synthetic waxes.

The fluorinated compound preferably is a polymer obtained from the polymerization of one or more fluorinated ethylenically unsaturated monomers wherein fluorine is derived from at least one substituent such as a (per)fluorinated linear or branched alkyl-substituent, a (per)fluorinated linear or branched alkylene-substituent and/or a (per)fluorinated (poly)alkyleneoxy-substituent and optionally one or more non-fluorinated ethylenically unsaturated monomers comprising substituents such as for example (poly)alkyleneoxy, hydroxyalkyl, carboxyl, amine, quaternary amine, sulfonate, sulfate, carboxylate, phosphate, phosphonate, alkylalkoxylate or aminocarboxylate substituents.

Alternatively the fluorinated compound may comprise a fluorinated tail selected from the group consisting of (per)fluorinated polyoxyalkylene; poly-1,1-difluoroethylene; copolymers of tetrafluoroethylene and hexafluoropropylene; terpolymers of hexafluoropropylene, tetrafluoroethylene, and ethylene; and terpolymers of tetrafluoroethylene, hexafluoropropylene and 1,1-difluorethylene, and a non-fluorinated head such as for example a polyoxyalkylene, hydroxyalkyl, carboxyl, amine, quaternary amine, sulfonate, sulfate, carboxylate, phosphate, phosphonate, alkylalkoxylate or aminocarboxylate comprising head group.

Optionally the fluorinated compounds comprise a linking group between the fluorinated portion and the non-fluorinated portion such as for example alkylene, arylene, sulfonamidoalkylene, carbonamidoalkylene, oxydialkylene, thiodialkylene or alkylenecarbama to.

The silicones are preferably straight chain, cyclic, branched, dendritic, or network polysiloxane(s). Straight chain or a partially branched straight chain polysiloxanes are particularly preferred.

Preferred polysiloxanes include polymers and copolymers comprising dimethylsiloxane units, methylhydrogensiloxane units, diphenylsiloxane units, phenylmethylsiloxane units, dimethylhydrogensiloxane units and trimethylsiloxane units.

Polysiloxanes with pendant fluorinated groups may be used as well.

The hydrocarbons may be a homopolymers of ethylene or propylene, or a copolymer of ethylene with one or more 1-olefins, in particular propylene. 1-Olefins used are linear or branched olefins having 2-18 carbon atoms, preferably 3-6 carbon atoms. The 1-olefins may carry an aromatic substitution. Examples of these 1-olefins are ethylene, propylene, 1-butene, 1-hexene, 1-octene and 1-octadecene, and also styrene. Preference is given to homopolymers of ethylene or propylene or copolymers of ethylene with propylene or 1-butene.

The hydrocarbon may be a functionalized polyolefin, a functionalized vinyl aromatic polymer or a functionalized copolymer of one or more vinyl aromatic monomers and one or more alkene or alkadiene such as for example polyethylene, polypropylene, polystyrene or poly(ethylene-styrene) random copolymer, preferably comprising a terminal functional group such as a hydroxyl, a carboxyl, an amine, a quaternary ammonium, an anhydride, an imidazolinium, sulfonium or a phosphonium group.

Polar polyolefin may be obtained by oxidizing an ethylene or propylene homopolymer or copolymer or grafting them, for example with maleic anhydride.

Further natural or synthetic waxes may comprise:
amide waxes preparable by reacting ammonia or ethylenediamine with stearic acid, tallow fatty acid, palmitic acid or erucic acid;
montan waxes, including acid waxes and ester waxes having a carbon chain length of the carboxylic acid of from C22 to C36;
ester waxes, preferably reaction products of the montanic acids with monohydric or polyhydric alcohols having 2 to 6 carbon atoms, such as ethanediol, 1,3-butanediol or 1,2,3-propanetriol, for example;

carnauba wax;

the reaction products of sorbitol with stearic acid, tallow fatty acid, palmitic acid or erucic acid;

Fischer-Tropsch waxes;

paraffins and microcrystalline waxes.

Preferably, the surface covering of the present invention comprises:

substrate A, having an upper and a lower surface;

polymer layer B, having an upper and a lower surface, comprising one or more polymers C, said one or more polymers C comprising more than 93.5% by weight of cellulose ester polymer; the lower surface of polymer layer B contacting and adhering to the upper surface of substrate A, a radiation cured polyurethane based topcoat D contacting and adhering to the upper surface of polymer B, and an additional polymer layer E comprising one or more polymers preferably selected from the group consisting of vinylacetal (co)polymers, (meth)acrylate comprising (co)polymers, vinyl alkanoate (co)polymers and polylactic acid.

Polymer layer B and the optional additional polymer layer E are prepared according to a process or a combination of processes well known in the art.

The hot polymer blend is prepared by compounding cellulose ester polymer (i) and polymers (ii to xiii) along with plasticizer(s), preferably bioplasticizers, lubricants, optionally filler(s) and one or more additives such as stabilizers, flame retardants and antistatic agents in a suitable heated mixer, for example in a twin screw or a single screw extruder, a mixing bowl with heated jacket, a Banbury mixer, continuous mixer, a ribbon mixer or any combination thereof at an internal temperature comprised between 150 and 240° C., preferable between 170 and 220° C., more preferable between 180 and 210° C. to form a blend.

The surface covering can be obtained from heat lamination, under pressure at a temperature comprised between 90 and 220° C., of cast extruded polymer layer B and additional polymer layer E, to substrate A.

Preferably a top coat D is applied on top of polymer layer B.

Thereto the coating compositions of the present invention may be applied by any suitable coating process known to those of ordinary skill in the art, for example by direct gravure coating, reverse gravure coating, offset gravure coating, smooth roll coating, curtain coating, spray coating and combinations thereof. Direct gravure coating and smooth roll coating are preferred.

Curing may be performed at a temperature comprised between 20 and 250° C., preferably between 60 and 220° C., more preferably between 100 and 190° C. Curing is performed either under ambient conditions or through convection heat or through Infrared irradiation.

For radiation curable coating compositions, curing preferably is carried out at room temperature but can also be done at temperatures higher than room temperature.

The coating composition is preferably subjected to actinic radiation such as ultraviolet (UV) radiation with a wavelength of for instance 170-600 nm, whereupon crosslinking is completed.

Examples of radiation sources are medium and high-pressure mercury vapour lamps, lasers, pulsed lamps (flashlight), halogen lamps and excimer emitters.

Preferably, within the context of the present invention, one or more medium pressure mercury vapour UV radiators of at least 80 to 250 W/linear cm are used. Preferably said medium pressure mercury vapour UV radiator(s) is (are) positioned at a distance of from about 5 to 20 cm from the substrate. The irradiating time period preferably is comprised between 1 and 60 seconds for having a radiation dose in the range of from 80 to 3000 mJ/cm$^2$.

Preferably within the context of the present invention, the radiation curable coating composition is crosslinked through irradiation emitted by one or more excimer lamp(s), preferably dielectric barrier discharge excimer lamp(s), more preferably Xenon (Xe*$_2$) dielectric barrier discharge excimer lamps.

On the other hand the radiation curable coating composition can be cured by bombardment with high-energy electron beams (EB) at for instance 150-300 keV. For this particular case, the coating formulations that do not comprise photoinitiators or photoactivators. From economical point of view electron-beam curing yet is less attractive as the equipment is quite expensive.

In a particular embodiment of the present invention, the top surface of the polymer layer B is subjected to a plasma treatment, preferably a corona treatment, adjusted to provide a surface energy of at least 38 mN/m, preferably of at least 40 mN/m, more of at least 42 mN/m, according to ASTM D2578.

Corona plasma treatment ideally is done on-line immediately before application of the curable coating composition.

The surface coverings of the present invention are characterized in that:

the thickness of substrate A is comprised between 0.5 and 15 mm, preferably between 1 and 10 mm, more preferably between 1.5 and 6 mm;

the thickness of polymer layer B is comprised between 0.05 and 3.0 mm, preferably between 0.1 and 2.0 mm, more preferably between 0.2 and 1.0 mm;

the thickness of the optional additional polymer layer E is comprised between 0.1 and 2.0 mm, more preferably between 0.2 and 1.5 mm.

the thickness of the topcoat layer D is comprised between 1 and 50 µm, preferably between 2 and 40 µm, more preferably between 3 and 30 µm.

EXAMPLES

The following illustrative examples are merely meant to exemplify the present invention and are not destined to limit or otherwise define the scope of the present invention.

Polymer layer B-1 is composed of 95 parts of cellulose acetate propionate (CAP 482 20 from Eastman) 5 parts of (meth)acrylic (co)polymer (Kane Ace™ PA 211 from Kaneka), 30 parts of acetyl tributyl citrate (Citrofol BII from Jungbunzlauer) and 1.3 parts of Licolub WE 40 powder from Clariant.

Polymer layer B-2 has an identical composition as wear layer 1 wherein cellulose acetate propionate is replaced by cellulose acetate butyrate (CAB 381 20 from Eastman.

The composition of substrate A is reproduced table 1.

In this table PVB stand for polyvinyl butyral, PVC stands for polyvinyl chloride and BI 1 stands for a polymer blend comprising 40 parts of recycled polyvinyl butyral Sharkpellet C2c from Shark Solutions, 20 parts of polylactic acid Ingeo 4043D from NatureWorks, 30 parts of polymethylmethacrylate Kane PA 211 from Kaneka, 4 parts of Epoxidized soja Oil drapex 6.8 from Artek as lubricant, 10 parts of EVA Levamelt 900 from Lanxess, 1.5 part of Stearic Acid Radiacid 0444 from Oleon, 0.3 part of antioxidant Irganox 1010 from BASF and 75 parts of chalk Micronic P5 from Imerys.

In the rows representing "polymer layer 1", "polymer layer 2" and "additional polymer layer", the first line represents the type of polymer or polymer blend, the second line represents the Shore A or Shore D values, while the third line represents the layer thickness.

GFM stand for Glass Fiber Matt with an air permeability greater than 5000 l/m²·s.

TABLE 1

| Example | 1 | 2 | 3 | 4 | 5 | 6 | 7 | 8 |
|---|---|---|---|---|---|---|---|---|
| Polymer layer 1 | PVB A90 0.55 | | | | PVC D63 1.5 | PVC D63 1.5 | | PVC A90 1.1 |
| GFM | 0.35 | 0.35 | | | 0.35 | 0.35 | | 0.35 |
| Polymer layer 2 | PVB A90 0.55 | BI 1 A95 1.2 | BI 1 A95 1.6 | BI 1 A95 2.4 | PVC D63 2.25 | PVC D63 2.25 | BI 1 A95 4.0 | PVC A95 0.5 |
| Additional polymer layer | BI 1 A95 0.4 | | | | | BI 1 A95 1.2 | | |
| Substrate thickness | 1.95 | 1.65 | 1.7 | 2.5 | 4.2 | 5.4 | 4.1 | 1.95 |
| Deformation | 40° | 30° | 20° | 10° | 7° | 5° | 3° | 45° |

In table 2 curling values, in mm, are reproduced for the combination polymer layer B/substrate A/additional polymer layer E for the different polymer B types (1 or 2) at a layer thickness of 0.25 mm.

Curling is measured at 23° C. and indicates the deviation, in millimeter, of the corners/edges of the surface covering from a completely flat configuration. A low curling surface covering thus is characterized by a curling of less than 12 mm, preferably of less than 6 mm and more preferably of 0 mm.

TABLE 2

| Example | 1 | 2 | 3 | 4 | 5 | 6 | 7 | 8 |
|---|---|---|---|---|---|---|---|---|
| B-1 layer 0.25 mm | 12 | 5 | 2 | 0 | 0 | 0 | 0 | 20 |
| B-2 layer 0.25 mm | 10 | 2 | 0 | 0 | 0 | 0 | 0 | 17 |

For example 1 to 7 a scuff resistance that varies between 14 and 15 is measured. For example 8, given as comparative example, the scuff resistance cannot be measured because of tremendous curling.

The scuff resistance is assessed using a friction test apparatus wherein an Astral rubber tool with thickness of 5 mm and a width of 0.8 mm, while subjected to a loading of "Y" kg is moved "X" times over 25 cm over the test area at a speed of 0.40 m/s.

In the test the rubber tool, before touching the test panel (39×39 cm) is moved over 2 cm of abrasive paper (P600)

The complete test consists of:

| "X" | "Y" |
|---|---|
| 6 | 9 |
| 4 | 7 |
| 2 | 5 |
| 1 | 4 |
| 1 | 3 |

After each test series (for example 6 times with a 9 kg loading) the test panel is visually evaluated on a 0 to 3 scale where:
0 results in severe damage
1 results in damage
2 results in slight damage
3 results in no visual damage Finally the test result of the respective series are added together for a final result comprised between 0 and 15.

By way of comparison, a "Micodur" surface covering (LICO Swiss Quality Floors, comprising a perfectly stable mineral core board represents a deformation of 0 degrees and a curling for both polymer layers B (B-1 and B-2), at thicknesses of 0.25 mm, of 0 mm.

The invention claimed is:

1. A surface covering, comprising:
a substrate (A), having an upper and a lower surface, said substrate (A) being characterized by a deformation of less than 40 degrees as measured for a rectangular substrate (A) sample with dimensions of 160 mm×450 mm, partially contacting and fixed in a horizontal position to a plate support, so that exactly a 160×300 mm part of said sample exceeds the edge of the plate support and is free of support during the deformation measurement,
the deformation being recorded 30 seconds after removing means that prevent a deformation of the 160×300 mm part under the influence of its own weight,
the deformation, being the angle, in degrees, between the horizontal position and the position after 30 seconds, of the extreme bottom edge of the freely suspended 160×300 mm part of said rectangular substrate sample (A), free of support and deforming under its own weight away from the horizontal position;
a scuff resistant polymer layer (B) having an upper and a lower surface, said polymer layer (B) comprising one or more polymers (C), said one or more polymers (C) comprising more than 93.5% by weight of one or more cellulose ester polymers;
the lower surface of polymer layer (B) contacting and adhering to the upper surface of substrate (A),
wherein substrate (A) comprises a layer selected from the group consisting of polymer, natural stone, agglomerated stone, ceramic, metal, fibrocement plate, hybrid polymer composite material and combinations thereof,
and wherein the surface covering comprises a top-layer (D) contacting and adhering to the upper surface of scuff resistant polymer (B).

2. The surface covering according claim 1, wherein the one or more cellulose ester polymers of polymer layer (B) comprises:
a plurality of C2-C5 alkanoyl substituents and
a plurality of hydroxyl substituents
wherein the degree of substitution of the hydroxyl substituents is in the range of from 0.3 to 1.0.

3. The surface covering according to claim 1, wherein the one or more cellulose ester polymers are selected from the group consisting of cellulose acetate, cellulose propionate, cellulose butyrate, cellulose acetate propionate, cellulose acetate butyrate and cellulose propionate butyrate.

4. The surface covering according to claim 1, wherein one or more polymers (C) of the polymer layer (B) comprise more than 93.5% by weight of one or more cellulose ester polymers, the remaining weight percentage being supplemented, up to 100% by weight of polymers, by one or more polymers selected from the group consisting of (meth) acrylate comprising (co)polymers, vinyl alkanoate comprising (co)polymers, vinylacetals (co)polymers, polyether ester thermoplastic elastomers, (co)polyesters, (co)polyamides, polyurethanes, nitrile (co)polymers, styrene (co)polymers, vinylchloride (co)polymers, olefin (co)polymers, and ionomers.

5. The surface covering according to claim 1, wherein polymer layer (B) comprises up to 100 parts by weight of plasticizer for 100 parts by weight of one or more polymers (C), said plasticizer being selected from the group consisting of dialkyl esters of aliphatic dicarboxylic acids; alkyl esters of aromatic mono-di-, tri-, or tetra-carboxylic acids; lower alkyl phosphates; lower alkyl-aryl phosphates; aryl phosphates; alkyl sulfonates; epoxidized or otherwise derivatized vegetable oils, and acetylated monoglycerides.

6. The surface covering according to claim 1, comprising an additional polymer layer (E), having an upper and a lower surface, the upper surface of additional polymer layer (E) contacting the lower surface of substrate (A), said additional polymer layer (E) comprising one or more polymers selected from the group consisting of cellulose ester (co)polymers, (meth)acrylate comprising (co)polymers, vinyl alkanoate comprising (co)polymers, vinylacetals (co)polymers, polyether ester thermoplastic elastomers, (co)polyesters, (co)polyamides, polyurethanes, nitrile (co)polymers, styrene (co)polymers, vinylchloride (co)polymers, olefin (co)polymers, and ionomers.

7. The surface covering according to claim 1, wherein the top-layer (D) comprises, as binder (I), one or more polymers selected from the group consisting of epoxy resin, epoxy ester resin, vinyl ester resin, polyester, alkyd resin, polyamide, polyurethane, polyether, (meth)acrylate (co)polymer, vinyl (co)polymer and aminoplast resin.

8. The surface covering according to claim 1, wherein the top-layer (D) comprises:
    up to 25% by weight of one or more types of micro-scale particle(s) (II) with a volume median particle diameter (D50) comprised between 1 and 50 µm as obtained from laser light scattering measurements according to ISO 13320; and/or
    up to 20% by weight of one or more compound(s) (III) selected from the group consisting of silicones, fluorocarbons, fluorinated silicones, hydrocarbons, natural waxes and synthetic waxes.

9. The surface covering according to claim 1, wherein the top-layer (D) is a crosslinked layer.

10. The surface covering according to claim 1, characterized by a Scuff Resistance of 8 or higher as assessed in a friction test apparatus with an Astral Rubber tool.

11. The surface covering according to claim 1 wherein:
    the thickness of substrate (A) is comprised between 0.5 and 15 mm; and/or
    the thickness of polymer layer (B) is comprised between 0.05 and 3.0 mm.

12. The surface covering as claimed in claim 1, wherein the surface covering is one of a floor covering and a wall covering.

13. Process for the preparation of the surface covering according to claim 1, comprising the steps of:
    providing a substrate (A);
    laminating the composition comprising one or more polymers (C), said one or more polymers (C) comprising more than 93.5% by weight of cellulose ester polymers, to the upper surface of substrate (A);
    fusing and gelling said composition to form polymer layer (B)
    applying a top-layer formulation on the upper surface of polymer layer (B) and converting the top-layer formulation into top-layer (D).

14. The process according to claim 13, wherein the top-layer formulation is converted into top-layer (D) through subjecting said coating formulation to actinic radiation.

15. The process according to claim 14 wherein the actinic radiation is emitted by excimer lamps.

16. The process according to claim 13, wherein the top-layer formulation is polyurethane based.

17. A surface covering, comprising:
    a substrate (A), having an upper and a lower surface, said substrate (A) being characterized by a deformation of less than 40 degrees as measured for a rectangular substrate (A) sample with dimensions of 160 mm×450 mm, partially contacting and fixed in a horizontal position to a plate support, so that exactly a 160×300 mm part of said sample exceeds the edge of the plate support and is free of support during the deformation measurement,
        the deformation being recorded 30 seconds after removing means that prevent a deformation of the 160×300 mm part under the influence of its own weight,
        the deformation, being the angle, in degrees, between the horizontal position and the position after 30 seconds, of the extreme bottom edge of the freely suspended 160×300 mm part of said rectangular substrate sample (A), free of support and deforming under its own weight away from the horizontal position;
    a scuff resistant polymer layer (B) having an upper and a lower surface, said polymer layer (B) comprising one or more polymers (C), said one or more polymers (C) comprising more than 93.5% by weight of one or more cellulose ester polymers;
    the lower surface of polymer layer (B) contacting and adhering to the upper surface of substrate (A),
    wherein substrate (A) comprises a layer selected from the group consisting of polymer, natural stone, agglomerated stone, ceramic, metal, fibrocement plate, hybrid polymer composite material and combinations thereof, and wherein the surface covering comprises a top-layer (D) contacting and adhering to the upper surface of scuff resistant polymer (B),
    wherein polymer layer (B) comprises up to 100 parts by weight of plasticizer for 100 parts by weight of one or more polymers (C), said plasticizer being selected from the group consisting of dialkyl esters of aliphatic dicarboxylic acids; alkyl esters of aromatic mono- di-, tri-, or tetra-carboxylic acids; lower alkyl phosphates; lower alkyl-aryl phosphates; aryl phosphates; alkyl sulfonates; epoxidized or otherwise derivatized vegetable oils, and acetylated monoglycerides.

18. The surface covering according to claim 17, wherein the one or more cellulose ester polymers are selected from the group consisting of cellulose acetate, cellulose propionate, cellulose butyrate, cellulose acetate propionate, cellulose acetate butyrate and cellulose propionate butyrate.

19. The surface covering according to claim 17, wherein one or more polymers (C) of the polymer layer (B) comprise more than 93.5% by weight of one or more cellulose ester polymers, the remaining weight percentage being supplemented, up to 100% by weight of polymers, by one or more polymers selected from the group consisting of (meth) acrylate comprising (co)polymers, vinyl alkanoate comprising (co)polymers, vinylacetals (co)polymers, polyether ester thermoplastic elastomers, (co)polyesters, (co)polyamides, polyurethanes, nitrile (co)polymers, styrene (co)polymers, vinylchloride (co)polymers, olefin (co)polymers, and ionomers.

20. The surface covering according to claim 17, wherein the top-layer (D) comprises, as binder (I), one or more polymers selected from the group consisting of epoxy resin, epoxy ester resin, vinyl ester resin, polyester, alkyd resin, polyamide, polyurethane, polyether, (meth)acrylate (co)polymer, vinyl (co)polymer and aminoplast resin.

* * * * *